United States Patent
Maheshwari et al.

(10) Patent No.: US 6,248,831 B1
(45) Date of Patent: Jun. 19, 2001

(54) HIGH STRENGTH POLYETHYLENE FILM

(75) Inventors: Vinayak Maheshwari, Dunbar, WV (US); Robert Charles Job, Bound Brook, NJ (US); William A. Hoffman, III, Ridgewood, NJ (US); William James Michie, Jr., Raritan, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/455,234

(22) Filed: Dec. 6, 1999

(51) Int. Cl.$^7$ ............................ C08F 8/00; C08L 23/00

(52) U.S. Cl. ................................... 525/191; 525/240

(58) Field of Search ........................... 525/191, 240

(56) References Cited

U.S. PATENT DOCUMENTS

| | | | |
|---|---|---|---|
| 5,047,468 | * 9/1991 | Lee et al. | 525/53 |
| 5,122,494 | 6/1992 | Job | 502/125 |
| 5,371,157 | 12/1994 | Job | 526/124 |
| 5,405,901 | 4/1995 | Daniell et al. | 525/53 |
| 5,503,914 | * 4/1996 | Michie, Jr. et al. | 428/220 |

* cited by examiner

*Primary Examiner*—Nathan M. Nutter
(74) *Attorney, Agent, or Firm*—Saul R. Bresch

(57) ABSTRACT

A process for production of a polyethylene blend in situ comprising contacting ethylene and at least one alpha-olefin with a magnesium/titanium based catalyst system including a partially activated precursor and a cocatalyst in each of two fluidized bed reactors connected in series, one of the provisos being that the precursor is formed by contacting an alkylaluminum halide with a solid reaction product prepared from a magnesium alkoxide, a titanium tetraalkoxide, and a solubility enhancing agent.

11 Claims, No Drawings

HIGH STRENGTH POLYETHYLENE FILM

TECHNICAL FIELD

This invention relates to a process for preparing an in situ polyethylene blend, which can be converted into film having an improved balance of high strength and exemplary extrusion characteristics.

BACKGROUND INFORMATION

There has been a rapid growth in the market for linear low density polyethylene (LLDPE), particularly resin made under mild operating conditions; typically at pressures of 100 to 300 psi and reaction temperatures of less than 100° C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization. Although the majority of the LLDPE resins on the market today have a narrow molecular weight distribution, LLDPE resins with a broad molecular weight distribution are available for a number of non-film applications.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

The blending of these polymers is successfully achieved in a staged reactor process similar to those described in U.S. Pat. Nos. 5,047,468 and 5,149,738. Briefly, the process is one for the in situ blending of polymers wherein a higher density ethylene copolymer is prepared in a high melt index reactor and a lower density ethylene copolymer is prepared in a low melt index reactor. The process typically comprises continuously contacting, under polymerization conditions, a mixture of ethylene and one or more alpha-olefins with a catalyst system in two gas phase, fluidized bed reactors connected in series, said catalyst system comprising: (i) a supported magnesium/titanium based catalyst precursor; (ii) an aluminum containing activator compound; and (iii) a hydrocarbyl aluminum cocatalyst, the polymerization conditions being such that an ethylene copolymer having a melt index in the range of about 0.1 to about 1000 grams per 10 minutes is formed in the high melt index reactor and an ethylene copolymer having a melt index in the range of about 0.001 to about 1 gram per 10 minutes is formed in the low melt index reactor, each copolymer having a density of about 0.860 to about 0.965 gram per cubic centimeter and a melt flow ratio in the range of about 22 to about 70, with the provisos that:

(a) the mixture of ethylene copolymer matrix and active catalyst formed in the first reactor in the series is transferred to the second reactor in the series;

(b) other than the active catalyst referred to in proviso (a) and the cocatalyst referred to in proviso (e), no additional catalyst is introduced into the second reactor;

(c) in the high melt index reactor:
  (1) the alpha-olefin is present in a ratio of about 0.02 to about 3.5 moles of alpha-olefin per mole of ethylene; and
  (2) hydrogen is present in a ratio of about 0.05 to about 3 moles of hydrogen per mole of combined ethylene and alpha-olefin;

(d) in the low melt index reactor:
  (1) the alpha-olefin is present in a ratio of about 0.02 to about 3.5 moles of alpha-olefin per mole of ethylene; and
  (2) hydrogen is, optionally, present in a ratio of about 0.0001 to about 0.5 mole of hydrogen per mole of combined ethylene and alpha-olefin; and (e) additional hydrocarbyl aluminum cocatalyst is introduced into the second reactor in an amount sufficient to restore the level of activity of the catalyst transferred from the first reactor to about the initial level of activity in the first reactor.

While the in situ blends prepared as above and the films produced therefrom are found to have the advantageous characteristics heretofore mentioned, the commercial application of these granular bimodal polymers is limited by unacceptable levels of gels in contrast to competitive bimodal resins produced from slurry or solution processes. Particle size distribution and flow characteristics studies indicate that the gas phase resins having an average particle size (APS) of about 400 to about 600 microns exhibit significant compositional, molecular, and rheological heterogeneities. When such a granular resin is compounded, for example, with a conventional twin screw mixer in a single pass, and the resulting pellets are fabricated into film, the film exhibits a high level of gels ranging in size from less than about 100 microns to greater than about 500 microns. These gels adversely effect the aesthetic appearance of the product. The gel characteristics of a film product are usually designated by a subjective scale of Film Appearance Rating (FAR) varying from minus 50 (very poor; these films have a large number of large gels) to plus 50 (very good; these films have a small amount of, or essentially no, gels). The FAR of the single pass film product mentioned above is generally in the range of about minus 50 to about minus 10/0. For commercial acceptability, the FAR should be plus 20 or better.

Several patents have successfully addressed the gel problem. One such patent is U.S. Pat. No. 5,405,901. Unfortunately, this patent, for example, suffers from other deficiencies. The extrusion line speed of the product resin, which is a measure of bubble strength and stability, is found to be in the neighborhood of 90 feet per minute, and the dart drop strength, while high for one mil film, is not achievable on 0.5 mil film due to low bubble stability. Meanwhile, in the realm of high and medium density, high molecular weight film applications, industry is seeking resins with minimum extrusion line speeds of about 210 feet per minute and thus films with higher bubble strength and stability together with higher dart drop strength in the narrower gauges.

DISCLOSURE OF THE INVENTION

An object of this invention, therefore, is to provide a process for preparing an in situ blend, which, can be extruded into a film at high line speeds, the film having the bubble strength and stability, which translates into high strength, particularly in terms of dart drop. Other objects and advantages will become apparent hereinafter.

According to the present invention such a process for the production of a polyethylene blend in situ has been discovered. The process comprises contacting ethylene and at least one alpha-olefin comonomer having 3 to 8 carbon atoms with a magnesium/titanium based catalyst system including a partially activated precursor and a cocatalyst in each of two fluidized bed reactors connected in series, in the gas phase, under polymerization conditions, with the provisos that:

(a) the precursor is formed by contacting an alkylaluminum halide with a solid reaction product prepared from a magnesium alkoxide, a titanium tetraalkoxide, and a solubility enhancing agent;

(b) the mixture of ethylene copolymer matrix and active catalyst formed in the first reactor in the series is transferred to the second reactor in the series;

(c) other than the active catalyst referred to in proviso (b) and the cocatalyst referred to in proviso (f), no additional catalyst is introduced into the second reactor;

(d) in the first reactor in which a low melt index copolymer is made:
  (1) alpha-olefin is present in a ratio of about 0.005 to about 0.4 mole of alpha-olefin per mole of ethylene;
  (2) hydrogen is, optionally, present in a ratio of about 0.0001 to about 0.3 mole of hydrogen per mole of ethylene; and
  (3) the ethylene partial pressure is in the range of about 10 to about 100 pounds per square inch; and (e) in the second reactor in which a high melt index copolymer is made:
  (1) alpha-olefin is, optionally, present in a ratio of about 0.005 to about 0.6 mole of alpha-olefin per mole of ethylene;
  (2) hydrogen is, optionally, present in a ratio of about 1.0 to about 3.0 moles of hydrogen per mole of ethylene; and
  (3) the ethylene partial pressure is in the range of about 50 to about 120 pounds per square inch; and (f) additional hydrocarbyl aluminum cocatalyst is introduced into the second reactor in an amount sufficient to restore the level of activity of the catalyst transferred from the first reactor to about the initial level of activity in the first reactor.

DESCRIPTION OF THE PREFERRED EMBODIMENT(S)

As noted, the blend is produced in two staged reactors connected in series wherein a mixture of resin and activated catalyst precursor is transferred from the first reactor to the second reactor in which another copolymer is prepared and blends in situ with the copolymer from the first reactor. It will be understood by those skilled in the art that the transfer is effected without exposing the mixture to the atmosphere.

The copolymers produced in each of the reactors are copolymers of ethylene and at least one alpha-olefin comonomer having 3 to 8 carbon atoms, preferably one or two alpha-olefin comonomers. The alpha-olefins can be, for example, propylene, 1-butene, 1-hexene, 4-methyl-1-pentene, and 1-octene.

Preferred comonomer combinations:

| first reactor | second reactor |
|---|---|
| 1-hexene | 1-hexene |
| 1-butene | 1-hexene |
| 1-butene | 1-butene |
| 1-hexene | 1-butene |

The 1-hexene/1-hexene combination is found to give the best film properties; however, the 1-hexene/1-butene combination is found to provide acceptable properties while still meeting FDA specifications since a terpolymer increases the FDA allowable comonomer content, e.g., for a 1-hexene copolymer, the maximum allowable comonomer content is 10 percent by weight whereas for a 1-hexene/1-butene terpolymer, the maximum allowable comonomer content is 15 percent by weight. For FDA purposes, the 1-hexene/1-hexene combination is considered a copolymer and the 1-hexene/1-butene combination is considered a terpolymer.

It will be understood that the in situ blend can be characterized as a bimodal resin. The properties of bimodal resins are strongly dependent on the proportion of the high molecular weight component, i.e., the low melt index component. For a staged reactor system, the proportion of the high molecular weight component is controlled via the relative production rate in each reactor. The relative production rate in each reactor can, in turn, be controlled by a computer application program, which monitors the production rate in the reactors (measured by heat balance) and then manipulates the ethylene partial pressure in each reactor and catalyst feed rate in order to meet the production rate, the production rate split, and catalyst productivity requirements.

It will be further understood that there may be a second alpha-olefin comonomer in each reactor coming from a vent recovery system, for example. In this case, recovered liquids containing both comonomers are fed into the first reactor and there is carryover from the first reactor to the second reactor due to the solubility of the comonomer in the resin. This could account for a terpolymer in each reactor. The molar ratio of C6 to C4 (or other combination of higher alpha-olefin to lower alpha-olefin) is preferably no less than about 5:1 in the first reactor. Any molar ratio is satisfactory in the second reactor. In any case, the overall molar ratios of alpha-olefin to ethylene in each reactor do not change.

High speed extrusion bubble stability is an important factor in blown film extrusion processes. A blown film extrusion process is one in which molten polymer is forced through an annular die to form a continuous cylindrical tube. Outside the die, the tube is blown out to a larger diameter than the die diameter, cooled by an air ring, and then flattened before wind-up. The ratio of the final diameter of the cylindrical tube to the diameter of the annulus is called the blow-up ratio (BUR). The combination of the extrusion rate, BUR, and the speed with which the tube is drawn out determines the final film thickness. The ability to produce thinner films at higher rates of extrusion is governed by many factors including the molecular and Theological characteristics of the molten polymer, dependence of properties on temperature, and the design of the air ring.

The entire cylindrical tube between the die and the collapsing frame (where the tube is flattened) is called the "bubble." This is a cylindrical bubble in contrast to traditionally familiar spherical bubbles in which air, or some other gas, is enveloped by a thin liquid film. Here, air is used to blow a thin molten polymer film. The bubble looks conical from the outside because of a change in the diameter until the solidification at the frost-line height (FLH).

Sometimes, e.g., with high density polyethylene, the bubble looks like a cylindrical semi-molten tube with a diameter approximately equal to the ring diameter before being blown out into a larger diameter. Past the FLH, however, the shape does not change from a circular cylindrical tube of constant diameter. Note that between the die and the FLH the bubble is always semi-molten.

One would like to produce a final film with close tolerance in film thickness under stable conditions of operation. That is, the shape of the bubble remains the same without any change over time. The highest extrusion rate and the highest wind-up speed that can be used without changing the shape of the bubble provides the operating constraints for a given resin in a given system (extruder, air ring, cooling air temperature, etc.). For example, at a given extrusion rate, if one can increase the wind-up speed to make thinner film without losing the shape of the bubble, then the resin is said to have good high speed extrusion bubble stability.

Often, the bubble stability within a given extrusion system is directly related to the molecular characteristics which influence the behavior of the bubble. For example, it is easier to stretch chewing gum into a very thin thread without breakage than a rubber band. A rubber band stiffens as it is stretched and, beyond a certain point, it will break. However, the stiffening of the rubber band also gives it better stability since it will be less sensitive to external disturbances. This is not the case with the chewing gum since it deforms very easily and is very sensitive to disturbances. In the blown film concept, one would like to have rubber band behavior as the bubble is being blown and stretched rather than a chewing gum behavior. In this invention, the combination of a particular precursor, in situ blending, ethylene partial pressure, and other defined parameters has been found to provide better high speed extrusion bubble stability, i.e., the film can be drawn at higher wind-up speeds to produce thinner films.

The magnesium/titanium based catalyst system can be exemplified by the catalyst system described in U.S. Pat. No. 5,122,494. This system includes a precursor, an activator, and a cocatalyst. The precursor can be supported or unsupported. The precursor (prior to activation) is formed by contacting a magnesium alkoxide, a titanium tetraalkoxide, and small amount of a solubility enhancing agent which can be a species such as carbon dioxide, triethylborate, a bromide, or a phenolic compound selected from the group consisting of phenol and a phenol substituted with an alkyl, an alkoxy, a halogen, or a dialkylamino group and can be isolated as a solid either by removal of solvent (as described in U.S. Pat. No. 5,106,806) or by precipitation as a halide complex (as described in U.S. Pat. No. 5,066,737). The reaction product can be represented essentially by the formula $Mg_3Ti(OR)_8X_2$ wherein each R is independently an alkyl group having 1 to 4 carbon atoms, preferably ethyl, and each X is independently a halide anion or a monovalent anion of a phenolic compound. X is preferably chloride or an anion of ortho-cresol or 2,6-di-t-butyl-4-methylphenol. The precursor is partially activated by contacting with an alkylaluminum halide. The alkylaluminum halide is an activator compound and can be represented by the formula $R_nAlY_{3-n}$ wherein R is an alkyl group having 1 to 8 carbon atoms; Y is a halogen such as chlorine, bromine, or iodine, preferably chlorine; and n is 1 or 2. More detail can be found in U.S. Patent application Ser. No. 09/395,924 filed on Sep. 14, 1999, particularly examples 5 and 7.

Preferred activators include alkylaluminum mono- and dichlorides wherein each alkyl radical has 1 to 6 carbon atoms. Examples of preferred activators are diethylaluminum chloride (DEAC) and ethylaluminum dichloride (EADC). Other conventional activators can also be used if desired. The molar ratio of activator to titanium can be in the range of about 1:1 to about 150:1 and is preferably in the range of about 10:1 to about 30:1.

The cocatalyst, generally a hydrocarbyl aluminum cocatalyst, can be represented by the formula $R_3Al$, $(RAlO)_n$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum dihydride, di-isobutyl-hexylaluminum, isobutyl dihexylaluminum, trimethyl-aluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst is preferably added separately neat or as a solution in an inert solvent, such as isopentane, to the polymerization reactor at the same time as the flow of ethylene is initiated. The cocatalyst compounds can also be used as the activators referred to above.

As noted in U.S. Pat. No. 5,122,494, selectivity control agents can be used in the polymerization process if desired, preferably when the primary olefin is propylene.

As noted above, the precursor can be prepared as a granular solid or as a solution. In those cases where it is desired to support the soluble precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned soluble catalyst precursor into a silica support can be accomplished by mixing the precursor solution and silica gel in the electron donor solvent or other solvent followed by solvent removal under reduced pressure. When a support is not desired, the soluble catalyst precursor can be used in liquid form.

The entire catalyst system, which includes a partially activated precursor and the cocatalyst, is added to the first reactor. The catalyst is admixed with the copolymer produced in the first reactor, and the mixture is transferred to the second reactor. Insofar as the catalyst is concerned, only cocatalyst is added to the second reactor from an outside source.

The polymerization in each reactor is, preferably, conducted in the gas phase using a continuous fluidized process. A typical fluidized bed reactor is described in U.S. Pat. No. 4,482,687.

A relatively low melt index (or high molecular weight) copolymer is prepared in the first reactor. The first reactor is generally smaller in size than the second reactor because only a portion of the final product is made in the first reactor. The mixture of polymer and an active catalyst is usually transferred from the first reactor to the second reactor via an interconnecting device using nitrogen or second reactor recycle gas as a transfer medium.

In the high molecular weight (HMW) reactor:

Because of the low values, instead of melt index, flow index is determined and those values are used in this specification. The flow index (I 21.6) can be in the range of about 0.20 to about 5.0 grams per 10 minutes, and is preferably in the range of about 0.25 to about 4 grams per 10 minutes. The molecular weight of this polymer is, generally, in the range of about 250,000 to about 600,000. The density of the copolymer can be in the range of 0.890 to 0.940 gram per cubic centimeter, and is preferably in the range of 0.900 to 0.935 gram per cubic centimeter. The melt flow ratio (I 21.6/I 2.16) of the polymer can be in the range of about 20 to about 65, and is preferably about 22 to about 50.

Melt index (I 2.16) is determined under ASTM D-1238, Condition E. It is measured at 190° C. and 2.16 kilograms and reported as grams per 10 minutes. Melt index (I 5) can also be determined under ASTM D-1238, Condition P. It is measured at 190° C. and 5 kilograms and reported as grams per 10 minutes. Flow index (I 21.6) is determined under ASTM D-1238, Condition F. It is measured at 190° C. and 21.6 kilograms and reported as grams per 10 minutes. Melt flow ratio is the ratio of flow index (I 21.6) to melt index (I 2.16 or I 5).

In the low molecular weight (LMW) reactor:

A relatively high melt index (I 2.16) (or low molecular weight) copolymer is prepared in this reactor. The high melt index can be in the range of about 80 to about 1000 grams per 10 minutes, and is preferably in the range of about 150 to about 900 grams per 10 minutes. The molecular weight of the high melt index copolymer is, generally, in the range of about 15,000 to about 35,000. The density of the copolymer prepared in this reactor can be in the range of 0.925 to 0.970 gram per cubic centimeter, and is preferably in the range of 0.928 to 0.965 gram per cubic centimeter. The melt flow ratio (I 21.6/I 2.16) of this copolymer can be in the range of about 20 to about 65, and is preferably about 22 to about 50.

The blend or final product, as removed from the second reactor, can have a melt index (I 5) in the range of about 0.01 to about 2.0 grams per 10 minutes, and preferably has a melt index in the range of about 0.05 to about 1.0 grams per 10 minutes. The melt flow ratio (I 21.6/I 5) is in the range of about 20 to about 45, and is preferably in the range of about 22 to about 42. The average molecular weight of the final product is, generally, in the range of about 200,000 to about 350,000. The density of the blend can be in the range of 0.915 to 0.958 gram per cubic centimeter, and is preferably in the range of 0.920 to 0.955 gram per cubic centimeter.

The blend has a broad molecular weight distribution which can be characterized as bimodal. The broad molecular weight distribution is reflected in an Mw/Mn ratio of about 18 to about 32, preferably about 20 to about 30. Mw is the weight average molecular weight; Mn is the number average molecular weight; and the Mw/Mn ratio can be referred to as the polydispersity index (PDI), which can be viewed as a measure of the breadth of the molecular weight distribution.

The weight ratio of copolymer prepared in the high molecular weight reactor to copolymer prepared in the low molecular weight reactor can be in the range of about 0.8:1 to about 2.3:1, and is preferably in the range of about 0.9:1 to about 1.9:1. The optimum weight ratio is about 1.2:1 to about 1.5:1. This is also known as the split.

The magnesium/titanium based catalyst system, ethylene, alpha-olefin, and hydrogen are continuously fed into the first reactor; the polymer/catalyst mixture is continuously transferred from the first reactor to the second reactor; ethylene, alpha-olefin, and hydrogen, as well as cocatalyst are continuously fed to the second reactor. The final product is continuously removed from the second reactor.

In the low melt index, as reflected in flow index reactor, i.e., the first reactor: The mole ratio of alpha-olefin to ethylene can be in the range of about 0.005:1 to about 0.4:1, and is preferably in the range of about 0.02:1 to about 0.26:1. The mole ratio of hydrogen to ethylene can be in the range of about 0.0001:1 to about 0.3:1, and is preferably in the range of about 0.001:1 to about 0.18:1. The operating temperature is generally in the range of about 60° C. to about 100° C. Preferred operating temperatures vary depending on the density desired, i.e., lower temperatures for lower densities and higher temperatures for higher densities.

In the high melt index reactor, i.e., the second reactor:

The mole ratio of alpha-olefin (optional) to ethylene can be in the range of about 0.005:1 to about 0.6:1, and is preferably in the range of about 0.01:1 to about 0.42:1. The mole ratio of hydrogen to ethylene can be in the range of about 1.0:1 to about 3:1, and is preferably in the range of about 1.3:1 to about 2.2:1. The operating temperature is generally in the range of about 70° C. to about 110° C. As mentioned above, the temperature is preferably varied with the desired density.

The total reactor pressure in the second reactor is usually higher than that used in the first reactor because of higher ethylene partial pressures and high hydrogen/ethylene requirements. The pressure, i.e., the total pressure in each reactor, can be in the range of about 200 to about 450 psig and is preferably in the range of about 280 to about 400 psig. The ethylene partial pressure in the first reactor can be in the range of about 10 to about 100 psi and is preferably in the range of about 20 to about 60 psi. The ethylene partial pressure in the second reactor can be in the range of about 50 to about 120 psi and is preferably in the range of about 60 to about 110 psi. The upper limit of ethylene partial pressure in the first reactor and the ethylene partial pressure in the second reactor are set according to the amount of copolymer it is desired to produce in each of these reactors, i.e., to achieve the split mentioned above. It is noted that increasing the ethylene partial pressure in the first reactor leads to an increase in ethylene partial pressure in the second reactor. Generally, the ethylene partial pressure roughly doubles in the second reactor over the first reactor. The balance of the total pressure is provided by alpha-olefin other than ethylene and an inert gas such as nitrogen.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessels; an interreactor transfer system; a vent recovery system; and, in each vessel: a bed, a gas distribution plate, inlet and outlet piping, a compressor, a cycle gas cooler, and a product discharge system. In each vessel, above the bed, there is a velocity reduction zone, and, in the bed, a reaction zone. Both are above the gas distribution plate.

A typical fluidized bed reactor is also described in U.S. Pat. No. 4,482,687.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. The partially activated catalyst precursor is preferably injected into the fluidized bed as a solid or a mineral oil slurry. The cocatalyst completes the activation. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate.

The hydrogen:ethylene molar ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

Several steps can be taken, in addition to temperature control, to prevent agglomeration. The product discharge line between the reactor and the product pot is often plugged up with chunks between intervals of product drops. A continuous purge flow of nitrogen or reactor gas in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, avoidance of quick change of gas composition, selective use of static-neutralizing chemicals and surface passivation with aluminum alkyls.

It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This passivation is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to reduce the level of static.

The residence time of the mixture of reactants including gaseous and liquid reactants, catalyst, and resin in each fluidized bed can be in the range of about 1 to about 12 hours and is preferably in the range of about 2 to about 5 hours.

The resin blend can be extruded into film in a conventional extruder adapted for that purpose. Extruders and processes for extrusion are described in U.S. Pat. No. 4,814,135; 4,857,600; 5,076,988; and 5,153,382. Examples of various extruders, which can be used in forming the film are a single screw type such as one modified with a blown film die and air ring and continuous take off equipment, a blown film extruder, and a slot cast extruder. A typical single screw type extruder can be described as one having a hopper at its upstream end and a die at its downstream end. The hopper feeds into a barrel, which contains a screw. The barrel can be smooth, but is preferably grooved. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C. and is preferably carried out at temperatures in the range of about 180 to about 240 degrees C.

The advantages of the invention are found in the high extrusion speed of the resin blend; the high bubble strength; and the high bubble stability. Thus, the blend can be extruded to thinner gauges at higher extrusion speeds, particularly gauges of 0.5 mil or less.

In order to maintain a constant production rate, increases in ethylene partial pressure are accompanied by decreases in the amount of catalyst fed. Consequently, catalyst productivity is increased, an additional advantage of the process.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Patents and patent application mentioned in this specification are incorporated by reference herein.

Molecular weights are weight average molecular weights unless otherwise noted.

The invention is illustrated by the following examples.

EXAMPLES 1 to 6

The catalyst precursor used in example 1 is manufactured in two steps. In the first step, 390 gallons of tetrahydrofuran (THF) is added to a solution preparation vessel to which BHT (butylated hydroxytoluene) is added as an inhibitor to prevent peroxide formation. Then, 62.5 pounds of aluminum reduced titanium trichloride [$TiCl_3$ or one part $TiCl_3$ to 3 parts $AlCl_3$ (by weight)] and 150 pounds of magnesium chloride ($MgCl_2$) are added. The mixture is heated to a temperature of 65 to 75 degrees C., and held for a period of 4 hours to dissolve. The solution is filtered to remove insolubles. Then, 220 pounds of silica are charged to the vessel. The silica is slurried with the solution and the slurry is pumped to a jacketed holding tank maintained at a temperature of 35 degrees C.

The second step involves spray drying the above slurry. This is accomplished by continuously feeding the slurry to a spray dryer. Hot nitrogen is circulated through the drying chamber, and the THF is evaporated leaving the $TiCl_3$/$MgCl_2$/THF/silica complex as a solid powder. The solids are then dropped into a slurry tank pre-loaded with dry mineral oil. The slurry tank is then rolled for several hours to produce the catalyst used in example 1. It is similar to the catalysts described in U.S. Pat. Nos. 4,376,062 and 4,293,673.

A magnesium/titanium alkoxide precursor, which is a solid reaction product, is prepared according to illustrative embodiment II from U.S. Pat. No. 5,124,298 carried out on a scale sufficient to obtain 300 pounds of granular material. Analysis (average of two runs): 12.3 percent Mg, 7.55 percent Ti, 60.3 percent $OEt^-$, 0.93 percent o-cresol (Cl= 11.5 percent by charge balance).

The activated precursor used in examples 2, 3, 5, and 6 is prepared as follows:

To a 10 gallon stainless steel reaction/filter vessel are charged 1,892 grams of magnesium/titanium alkoxide precursor powder together with 3.5 kilograms of hexane. Then, a solution of 3.9 kilograms of $SiCl_4$ and 713 grams of $TiCl_4$ in 6.6 kilograms of toluene is charged at such a rate (15 to 20 minutes) as to keep the reaction temperature between 25 and 30 degrees C. The slurry is then stirred for 30 minutes and filtered through an internal filter plate. The solids are washed by re-slurrying in 15 kilograms of a 50/50 (by weight) mixture of hexane and toluene, and are then isolated by filtration. In like manner, the solids are washed twice with hexane and dried under moving nitrogen. The yield is 2,472 grams of yellow powder. Analysis: 10.7 weight percent Mg; 9.82 weight percent Ti; and 36.2 weight percent Cl.

The vessel is recharged with 1,302 grams of the yellow powder and 5 kilograms of hexane. Then, 7,291 grams of 25 weight percent ethylaluminum dichloride in toluene are added at such a rate (15 minutes) as to keep the temperature between 25 and 30 degrees C. Then, 1,175 grams of 1 Molar $BCl_3$ in heptane are added all at once. After stirring for 30 minutes at 25 degrees C., the slurry is filtered. The solids are washed once with 50/50 (by weight) hexane/toluene, then twice with hexane and dried overnight under moving nitrogen as above. The yield is 1068 grams of dark brown powder. Analysis: 10.7 weight percent Mg; 9.62 weight percent Ti; 2.38 weight percent Al; and 56.7 weight percent Cl. A polymerization sample is prepared by slurrying 1.0 kilogram of the powder in 2.57 kilograms of mineral oil.

Example 1 is a comparative example and examples 2, 3, 5, and 6 represent high density and medium density embodiments of the invention. Example 4 compares the examples 2 and 3 resins with the example 1 resin.

EXAMPLE 1

About 85 pounds of polyethylene having a melt index of 1.0 gram per 10 minutes and a density of 0.920 gram per cubic centimeter made with the example 1 catalyst are charged to a first reactor as a seed bed. About 120 pounds of polyethylene having a flow index of 0.5 gram per 10 minutes and a density of 0.940 gram per cubic centimeter made with the example 1 catalyst are charged to a second reactor as a seed bed. Comonomers are ethylene and 1-hexene. Both reactors are then purged with high purity nitrogen at 80 degrees C. for several hours until the moisture content is below 10 ppm. Then, about 1500 cubic centimeters of 5 weight percent triethylaluminum (TEAL) in isopentane is charged to each reactor and circulated for a period of 4 hours. TEAL acts as a moisture scavenger. The reactors are then given 2 high pressure purges with nitrogen, and the conditions set forth in Table I are established in each reactor:

TABLE I

| reactor | first reactor | second reactor |
|---|---|---|
| temperature (° C.) | 85 | 110 |
| pressure (psia) | 300 | 345 |
| C2 partial pressure (psi) | 25 | 70 |
| H2/C2 molar ratio | 0.04 | 1.80 |
| C6/C2 molar ratio | 0.027 | 0.0075 |
| isopentane (mol %) | 12 | — |
| gas velocity (ft/sec) | 1.75 | 1.70 |

Approximately 225 cubic centimeters per hour of 5 weight percent TEAL in isopentane are fed to the first reactor and 130 cubic centimeters per hour of 5 weight percent TEAL in isopentane are fed to the second reactor to serve as cocatalyst. Then, the example 1 catalyst feed is initiated at the rate of 7.5 cubic centimeters per hour using a slurry catalyst feeder. The ethylene partial pressure in the first reactor is manipulated to result in a production rate of 30 pounds per hour of resin. The H2/C2 molar ratio and C6/C2 molar ratio are manipulated in the first reactor to result in a resin with a flow index of 0.25 to 0.50 decigram per minute and a density of 0.927 to 0.930 gram per cubic centimeter. The split in the resin exiting the second reactor, i.e., the final product, is 60/40 (weight percent), i.e., 60 percent high molecular weight resin and 40 percent low molecular weight resin. This is accomplished by manipulating the production rate of resin in the second reactor, which is, in turn, accomplished by adjusting the ethylene partial pressure. The melt index of the final product is about 800 grams per 10 minutes and the density is about 0.963 per cubic centimeter. At a total production rate of 50 pounds per hour (HMW+LMW), a total of 1100 pounds of resin are produced. The bulk resin properties are set forth in Table II as follows. The bimodal product properties are given in the second reactor column.

TABLE II

| reactor | first reactor | second reactor |
|---|---|---|
| flow index (g/10 min) | 0.25 to 0.50 | 6.50 to 10.0 |
| average flow index (g/10 min) | 0.43 | 6.7 |
| density (g/cc) | 0.928 to 0.932 | 0.946 to 0.950 |
| average density | 0.9298 | 0.9476 |
| melt flow ratio | — | 21.5 |

Note: In all of the Tables, melt flow ratios are ratios of I21 to I5.

EXAMPLE 2

The reactor conditions are set forth in Table III as follows:

TABLE III

| reactor | first reactor | second reactor |
|---|---|---|
| temperature (° C.) | 80 | 100 |
| pressure (psia) | 300 | 345 |
| C2 partial pressure (psi) | 38 | 70 |
| H2/C2 molar ratio | 0.02 | 1.80 |
| C6/C2 molar ratio | 0.021 | 0.0075 |
| isopentane (mol %) | 10 | — |
| gas velocity (ft/sec) | 1.75 | 1.70 |
| production rate (lbs/hr) | 25 | 18 |

The Table IV results are approximately the same as recited above for example 1. Thus, the low molecular weight made in the second reactor has a melt index of 800 grams per 10 minutes and a density of 0.960 gram per cubic centimeter. Approximately 600 pounds of resin are produced. The split is 58.5/41.5. The bulk resin properties are set forth in Table IV as follows. The bimodal product properties are given in the second reactor column.

TABLE IV

| reactor | first reactor | second reactor |
|---|---|---|
| flow index (g/10 min) | 0.25 to 0.50 | 6.50 to 10.0 |
| average flow index (g/10 min) | 0.47 | 6.95 |
| density (g/cc) | 0.928 to 0.932 | 0.946 to 0.950 |
| average density | 0.9288 | 0.946 |
| melt flow ratio | — | 26.23 |

More detail with respect to example 2 conditions and properties is given in Table V.

TABLE V

| reaction conditions | first reactor | second reactor |
|---|---|---|
| temperature(° C.) | 80 | 100 |
| pressure (psia) | 300 | 345 |
| comonomer | 1-hexene | 1-hexene |
| C2 partial pressure(psia) | 38 | 70 |
| H2/C2 molar ratio | 0.02 | 1.8 |
| C6/C2 molar ratio | 0.021 | 0.0075 |
| recycle isopentane (mol %) | 10 | 0 |
| C2 feed (lbs/hr) | 22 | 21 |
| catalyst feed rate (cc/hr) | 8 | — |
| 5% TEAL feed rate (cc/hr) | 380 | 130 |
| total production rate (lbs/hr) | — | 43 |
| production rate for each reactor (lbs/hr) | 25 | 18 |
| titanium split (%) | 58.3 | — |
| SGV (ft/sec) | 1.75 | 1.7 |
| fluidized bulk density (lbs/cu ft) | 15.3 | 13 |
| bed weight (lbs) | 85 | 120 |
| residence time (hrs) | 3.400 | 2.791 |
| catalyst carrier | isopentane and nitrogen | — |
| flow index (g/10 min) | 0.47 | 6.95 |
| melt index-I5 (g/10 min) | — | 0.265 |
| density(g/cc) | 0.9288 | 0.946 |
| melt flow ratio | — | 26.23 |
| residual Al (ppm) | 270 | 250 |
| residual titanium (ppm) | 17.5 | 10.2 |
| Al/Ti molar ratio | 28 | 40 |
| settled bulk density (lbs/cu ft) | 18.5 | 20.5 |
| average particle size(inch) | 0.05 | 0.047 |
| fines less than 120 mesh (wt %) | 2 | 3 |

EXAMPLE 3

The reactor conditions are set forth in Table VI as follows:

TABLE VI

| reactor | first reactor | second reactor |
|---|---|---|
| temperature (° C.) | 70 | 100 |
| pressure (psia) | 300 | 400 |
| C2 partial pressure (psi) | 51 | 94 |
| H2/C2 molar ratio | 0.055 | 1.65 |
| C6/C2 molar ratio | 0.016 | 0.0050 |
| isopentane (mol %) | 14 | — |
| gas velocity (ft/sec) | 1.7 | 1.65 |
| production rate (lbs/hr) | 30 | 20 |

The bulk resin properties are set forth in Table VII as follows. The bimodal product properties are given in the second reactor column.

TABLE VII

| reactor | first reactor | second reactor |
|---|---|---|
| flow index (g/10 min) | 0.25 to 0.50 | 6.50 to 10.0 |
| average flow index (g/10 min) | 0.39 | 7.01 |
| density (g/cc) | 0.928 to 0.932 | 0.946 to 0.950 |
| average density | 0.9297 | 0.947 |
| melt flow ratio | — | 28 |

More detail with respect to the conditions and properties for example 3 are given in Table VIII

TABLE VIII

| reaction conditions | first reactor | second reactor |
|---|---|---|
| temperature(° C.) | 70 | 100 |
| pressure (psia) | 300 | 400 |
| comonomer | 1-hexene | 1-hexene |
| C2 partial pressure(psia) | 51 | 94 |
| H2/C2 molar ratio | 0.055 | 1.6 |
| C6/C2 molar ratio | 0.016 | 0.005 |
| recycle isopentane (mol %) | 14.1 | 2 |
| C2 feed (lbs/hr) | 24 | 24 |
| catalyst feed rate (cc/hr) | 9 | — |
| 5% TEAL feed rate (cc/hr) | 330 | 150 |
| total production rate (lbs/hr) | — | 50 |
| production rate for each reactor(lbs/hr) | 30 | 20 |
| titanium split (%) | 58.4 | — |
| SGV (ft/sec) | 1.7 | 1.65 |
| bed weight (lbs) | 80 | 120 |
| residence time(hrs) | 2.667 | 2.400 |
| tap blowback | nitrogen | nitrogen |
| catalyst carrier | isopentane and nitrogen | — |
| flow index(g/10 min) | 0.39 | 7.01 |
| density(g/cc) | 0.9297 | 0.947 |
| residual Al (ppm) | 180 | 150 |
| residual titanium(ppm) | 7.7 | 4.5 |
| Al/Ti molar ratio | 28 | 40 |
| settled bulk density(lbs/cu ft) | 22.8 | 26 |
| average particle size(inch) | 0.035 | 0.031 |
| fines less than 120 mesh (wt %) | 1.00 | 1.50 |

Approximately 1500 pounds of resin are produced in each of examples 1 to 3.

EXAMPLE 4.

Although the reactor conditions used in the examples are somewhat different, the gas composition is adjusted so as to make products with similar bulk properties. The product evaluations of the resins produced in examples 2 and 3, however, result in films, which are superior to the film produced from the resin of example 1.

Samples of the three resins are submitted for Size Exclusion Chromatography (SEC) analysis. The SEC is performed with a Waters™ 150° C. analyzer with trichlorobenzene as solvent at 140 degrees C. with a broad molecular weight distribution standard and broad molecular weight distribution calibration method.

Example 1: Mn=13,848
Mw=283,537
PDI=20.47
Examples 2 and 3: Mn=12,179
Mw=333,221
PDI=27.36

The SECs reveal that the examples 2 and 3 products have a broader molecular weight distribution than the example 1 product. It is noted that the broadening occurs in the high molecular weight component. This is considered to be very beneficial for bubble stability.

The resin samples from examples 1 to 3 are compounded on a LCM-100 line (Long Continuous Mixer/Gear Pump Pelletizing System (LCM-100 G) from Kobe Steel, Ltd. The mixer is fitted with EL-2 type rotors from same manufacturer. Granular resin and additives are fed at room temperature under controlled oxygen level at feed and vent ports. The unit is typically run at 220 rpm, 10 to 40 percent gate opening and mixer barrel temperature control). Precautions are taken to eliminate the possibility of tailoring (oxidative degradation) during the compounding step. The compounded resin samples are then extruded in a 50 millimeter Alpine™ film extruder having an 80 millimeter die and a 1.0 millimeter die gap, and evaluated.

The example 1 resin sample runs at a maximum line speed of 105 feet per minute. The bubble is not stable at higher line speeds and collapses. The dart impact strength of this sample is measured at 240 grams on a 1 mil film. The film cannot be down gauged to 0.5 mil because of inferior bubble stability. These results verify that the precautions taken to avoid tailoring are adequate.

The examples 2 and 3 resin samples demonstrate significantly improved film properties. These samples run at a maximum line speed of 240 feet per minute. This represents a 130 percent increase in bubble stability. The dart impact strength of these samples is measured at 290 grams on a 1 mil film. The film is strong enough to be down gauged to 0.5 mil, and the dart impact strength at 0.5 mil is measured at 305 grams. Both samples result in similar product properties.

The Film Appearance Rating (FAR) is also very good, ranging from plus 20 to plus 40, for the examples 2 and 3 resin samples and for the MDHMW (medium density, high molecular weight) resin samples of example 5. Tensile strength, Elmendorf tear, and percent elongation are also improved.

EXAMPLE 5

The catalyst of examples 2 and 3 is also used to produce two medium density high molecular weight film products. The reactor conditions and process control methodology are similar to that used above for examples 2 and 3 except that adjustments are made in order to produce medium density resins as opposed to high density resins, and the results are similar also.

The two MDHMW resin samples also demonstrate significantly improved film properties. These samples exhibit maximum line speeds greater than 325 feet per second representing a greater than 210 percent increase in line speed over the example 1 resin sample. The dart impact strength of these samples at 0.8 and 0.35 mil are 470 grams and 376 grams, respectively, resulting in a normalized dart impact strength of 599 and 1069 grams, respectively, at 1 mil.

EXAMPLE 6

The following are the conditions and properties for four runs in which MDHMW resins are made. The catalyst is the same as the one used in examples 2, 3, and 5. See Tables IX, X, XI, and XII.

TABLE IX

| reaction conditions | first reactor | second reactor |
|---|---|---|
| temperature(° C.) | 70.1 | 84.9 |
| pressure (psia) | 333 | 376 |
| comonomers | 1-butene 1-hexene | 1-butene 1-hexene |
| C2 partial pressure(psia) | 36.1 | 85.0 |
| H2/C2 molar ratio | 0.042 | 1.79 |
| C4/C2 molar ratio | — | 0.085 |
| C6/C2 molar ratio | 0.047 | 0.003 |
| catalyst feed rate (cc/hr) | 3 | — |
| 5% TEAL feed rate (cc/hr) | 123 | 84 |
| production rate for each reactor (lbs/hr) | 25.1 | 16.8 |
| bed weight (lbs) | 84.5 | 118.0 |
| fluidized bulk density (lbs/cu ft) | 15.3 | 12.8 |
| bed volume (cu ft) | 5.5 | 9.2 |
| residence time (hrs) | 3.4 | 2.8 |
| STY (lbs/hr/cu ft) | 4.5 | 1.8 |
| split (energy balance) | 0.60 | 0.40 |
| split (Ti balance) | 0.57 | 0.43 |
| flow index (g/10 min) | 2.84 | 12.6 |
| melt index-I5 (g/10 min) | — | 0.49 |
| density(g/cc) | 0.9165 | 0.9316 |
| melt flow ratio | — | 25.6 |
| residual Al (ppm) | 85.0 | 91.4 |
| residual titanium(ppm) | 2.84 | 1.61 |
| Al/Ti molar ratio | 53.6 | 101.2 |
| bulk density (lbs/cu ft) | 18.7 | 21.5 |
| average particle size(inch) | 0.032 | 0.027 |
| C6 extractables (wt %) | — | 3.80 |
| fines less than 120 mesh (wt %) | 0.76 | 0.63 |

TABLE X

| reaction conditions | first reactor | second reactor |
|---|---|---|
| temperature(° C.) | 70.0 | 85.0 |
| pressure (psia) | 332 | 380 |
| comonomers | 1-butene 1-hexene | 1-butene 1-hexene |
| C2 partial pressure(psia) | 23.3 | 91.1 |
| H2/C2 molar ratio | 0.001 | 1.78 |
| C4/C2 molar ratio | 0.001 | 0.089 |
| C6/C2 molar ratio | 0.065 | 0.002 |
| catalyst feed rate (cc/hr) | 3 | — |
| 5% TEAL feed rate (cc/hr) | 128 | 85 |

TABLE X-continued

| reaction conditions | first reactor | second reactor |
|---|---|---|
| production rate for each reactor (lbs/hr) | 25.1 | 19.4 |
| bed weight (lbs) | 84.6 | 117.8 |
| fluidized bulk density (lbs/cu ft) | 14.9 | 13.2 |
| bed volume (cu ft) | 5.7 | 8.9 |
| residence time (hrs) | 3.4 | 2.6 |
| STY (lbs/hr/cu ft) | 4.4 | 2.2 |
| split (energy balance) | 0.57 | 0.43 |
| split (Ti balance) | 0.61 | 0.39 |
| flow index (g/10 min) | 1.06 | 3.7 |
| melt index-I5 (g/10 min) | — | 0.13 |
| density(g/cc) | 0.9105 | 0.9287 |
| melt flow ratio | — | 28.3 |
| residual Al (ppm) | 81.2 | 98.8 |
| residual titanium(ppm) | 2.50 | 1.53 |
| Al/Ti molar ratio | 57.4 | 115.6 |
| bulk density (lbs/cu ft) | 18.6 | 21.1 |
| average particle size(inch) | 0.029 | 0.027 |
| C6 extractables (wt %) | — | — |
| fines less than 120 mesh (wt %) | 0.35 | 0.52 |

TABLE XI

| reaction conditions | first reactor | second reactor |
|---|---|---|
| temperature(° C.) | 70.0 | 84.9 |
| pressure (psia) | 344 | 386 |
| comonomers | 1-butene 1-hexene | 1-butene 1-hexene |
| C2 partial pressure(psia) | 22.8 | 88.5 |
| H2/C2 molar ratio | 0.011 | 1.79 |
| C4/C2 molar ratio | — | 0.091 |
| C6/C2 molar ratio | 0.062 | 0.002 |
| catalyst feed rate (cc/hr) | 3 | — |
| 5% TEAL feed rate (cc/hr) | 119 | 81 |
| production rate for each reactor (lbs/hr) | 26.0 | 21.8 |
| bed weight (lbs) | 84.3 | 117.8 |
| fluidized bulk density (lbs/cu ft) | 14.8 | 12.7 |
| bed volume (cu ft) | 5.7 | 9.3 |
| residence time (hrs) | 3.2 | 2.5 |
| STY (lbs/hr/cu ft) | 4.6 | 2.4 |
| split (energy balance) | 0.54 | 0.46 |
| split (Ti balance) | 0.52 | 0.48 |

TABLE XI-continued

| reaction conditions | first reactor | second reactor |
|---|---|---|
| flow index (g/10 min) | 2.55 | 8.6 |
| melt index-I5 (g/10 min) | — | 0.24 |
| density(g/cc) | 0.9087 | 0.9282 |
| melt flow ratio | — | 36.0 |
| residual Al (ppm) | 97.8 | 85.8 |
| residual titanium(ppm) | 3.18 | 1.64 |
| Al/Ti molar ratio | 56.2 | 92.8 |
| bulk density (lbs/cu ft) | 17.8 | 21.1 |
| average particle size (inch) | 0.031 | 0.027 |
| C6 extractables (wt %) | — | — |
| fines less than 120 mesh (wt %) | 0.14 | 0.56 |

TABLE XII

| reaction conditions | first reactor | second reactor |
|---|---|---|
| temperature(° C.) | 70.1 | 85.0 |
| pressure (psia) | 337 | 383 |
| comonomers | 1-butene 1-hexene | 1-butene 1-hexene |
| C2 partial pressure(psia) | 23.2 | 82.7 |
| H2/C2 molar ratio | 0.015 | 1.79 |
| C4/C2 molar ratio | 0.002 | 0.147 |
| C6/C2 molar ratio | 0.059 | 0.002 |
| catalyst feed rate (cc/hr) | 3 | — |
| 5% TEAL feed rate (cc/hr) | 119 | 85 |
| production rate for each reactor (lbs/hr) | 26.6 | 20.7 |
| bed weight (lbs) | 84.4 | 117.9 |
| fluidized bulk density (lbs/cu ft) | 14.5 | 12.3 |
| bed volume (cu ft) | 5.8 | 9.6 |
| residence time (hrs) | 3.2 | 2.5 |
| STY (lbs/hr/cu ft) | 4.6 | 2.2 |
| split (energy balance) | 0.56 | 0.44 |
| split (Ti balance) | 0.56 | 0.44 |
| flow index (g/10 min) | 3.51 | 9.4 |
| melt index-I5 (g/10 min) | — | 0.25 |
| density(g/cc) | 0.9097 | 0.9255 |
| melt flow ratio | — | 36.8 |
| residual Al (ppm) | 90.0 | 92.4 |
| residual titanium(ppm) | 2.99 | 1.68 |
| Al/Ti molar ratio | 53.8 | 98.0 |
| bulk density (lbs/cu ft) | 18.0 | 20.6 |
| average particle size(inch) | 0.028 | 0.027 |
| C6 extractables | — | 4.57 |

TABLE XII-continued

| reaction conditions | first reactor | second reactor |
|---|---|---|
| (wt %) fines less than 120 mesh (wt %) | 0.21 | 0.53 |

Notes to above Tables:
1. Resin properties for second reactor: These are theoretical values based on the assumption that the second reactor copolymer is produced independently. In some cases the bimodal resin properties are given, i.e., the properties of the resin blend.
2. Density is measured by producing a plaque in accordance with ASTM D-1928, procedure C, and then testing as is via ASTM D-1505. The density is reported in gram per cubic centimeter.
3. production rate (lbs/hr)=the average resin production rate per hour based on a heat balance calculation (approximately equal to drum average production rate).
4. 5% TEAL=5 weight percent triethylaluminum and 95 weight percent isopentane.
5. titanium split (%)=residual ppm Ti in second reactor resin divided by residual ppm Ti in first reactor resin. This is an indirect measure of polymer split.
6. SGV (ft/sec)=superficial gas velocity in the bed.
7. The fluidized and settled bulk densities of each of the resins (not the blend) is given in pounds per cubic foot.
8. tap blowback=nitrogen is used to purge (blowback) the taps to avoid tap pluggage problems.
9. STY (lbs/hr/cu ft)=space/time/yield. This is equal to the resin production rate divided by the bed volume.
10. split (energy balance)=production rate in first reactor divided by the total production rate. The instantaneous production rate in each reactor is calculated by a heat balance on the reactor.
12. Dart Drop is determined under ASTM D-1709, procedure A.
13. Line Speed is the take off speed from an Alpine™ film line equipped with a 100 millimeter die and a 1 millimeter die gap. The film is produced in stalk mode with a 4:1 BUR (blow-up ratio) and a 6 to 8 times die diameter frost line height at about 45 kilograms output rate per hour.

What is claimed is:

1. A process for production of a polyethylene blend in situ comprising contacting ethylene and at least one alpha-olefin comonomer having 3 to 8 carbon atoms with a magnesium/titanium based catalyst system including a partially activated precursor and a cocatalyst in each of two fluidized bed reactors connected in series, in the gas phase, under polymerization conditions, with the provisos that:
   (a) the precursor is formed by contacting an alkylaluminum halide with a solid reaction product prepared from a magnesium alkoxide, a titanium tetraalkoxide, and a solubility enhancing agent;
   (b) the mixture of ethylene copolymer matrix and active catalyst formed in the first reactor in the series is transferred to the second reactor in the series;
   (c) other than the active catalyst referred to in proviso (b) and the cocatalyst referred to in proviso (f), no additional catalyst is introduced into the second reactor;
   (d) in the first reactor in which a low melt index copolymer is made:
      (1) alpha-olefin is present in a ratio of about 0.005 to about 0.4 mole of alpha-olefin per mole of ethylene;
      (2) hydrogen is, optionally, present in a ratio of about 0.0001 to about 0.3 mole of hydrogen per mole of ethylene; and
      (3) the ethylene partial pressure is in the range of about 10 to about 100 pounds per square inch; and
   (e) in the second reactor in which a high melt index copolymer is made:
      (1) alpha-olefin is, optionally, present in a ratio of about 0.005 to about 0.6 mole of alpha-olefin per mole of ethylene;
      (2) hydrogen is, optionally, present in a ratio of about 1.0 to about 3.0 moles of hydrogen per mole of ethylene; and
      (3) the ethylene partial pressure is in the range of about 50 to about 120 pounds per square inch; and
   (f) additional hydrocarbyl aluminum cocatalyst is introduced into the second reactor in an amount sufficient to restore the level of activity of the catalyst transferred from the first reactor to about the initial level of activity in the first reactor.

2. The process defined in claim 1 wherein the alkylaluminum halide can be represented by the formula $R_nAlY_{3-n}$ wherein R is an alkyl group having 1 to 8 carbon atoms; Y is a halogen; and n is 1 or 2.

3. The process defined in claim 1 wherein the solubility enhancing agent is carbon dioxide, triethylborate, a bromide, or a phenolic compound selected from the group consisting of phenol and a phenol substituted with an alkyl, an alkoxy, a halogen, or a dialkylamino group.

4. The process defined in claim 1 wherein the polymer formed in the first reactor has a flow index (I 21.6) in the range of about 0.20 to about 5.0 grams per 10 minutes and a density in the range of about 0.890 to about 0.940 gram per cubic centimeter and the polymer formed in the second reactor has a melt index (I 2.16) in the range of about 80 to about 1000 grams per 10 minutes and a density in the range of about 0.925 to about 0.970 gram per cubic centimeter, the weight ratio of first reactor polymer to second reactor polymer being in the range of about 0.8:1 to about 2.3:1.

5. The process defined in claim 1 wherein the alkylaluminum halide is represented by the formula $R_nAlY_{3-n}$ wherein R is an alkyl group having 1 to 8 carbon atoms, Y is a halogen, and n is 1 or 2 and the reaction product is represented by the formula $Mg_3Ti(OR)_8X_2$ wherein each R is independently an alkyl group having 1 to 4 carbon atoms and each X is independently a halide or a monovalent anion of a phenolic compound.

6. The process defined in claim 1 wherein the blend has a melt index (I 5) in the range of about 0.01 to about 2.0 grams per 10 minutes; a melt flow ratio (I 21.6/I 5) in the range of about 20 to about 45; and a density in the range of 0.915 to 0.958 gram per cubic centimeter.

7. The process defined in claim 1 wherein a high density polyethylene blend is produced under the following conditions:
   in the first reactor:
      (1) the alpha-olefin is 1-hexene and/or 1-butene and is present in a ratio of about 0.01 to about 0.04 mole of alpha-olefin per mole of ethylene;
      (2) hydrogen is present in a ratio of about 0.01 to about 0.1 mole of hydrogen per mole of ethylene; and
      (3) the ethylene partial pressure is in the range of about 25 to about 70 pounds per square inch; and
   in the second reactor:
      (1) the alpha-olefin is 1-hexene and/or 1-butene and is, optionally, present in a ratio of about 0.005 to about 0.05 mole of alpha-olefin per mole of ethylene;
      (2) hydrogen is present in a ratio of about 1.3 to about 2.2 moles of hydrogen per mole of ethylene; and
      (3) the ethylene partial pressure is in the range of about 50 to about 120 pounds per square inch.

8. The process defined in claim 7 wherein the blend has a melt index (I 5) in the range of about 0.1 to about 0.6 grams per 10 minutes; a melt flow ratio (I 21.6/I 5) in the range of about 23 to about 30; and a density in the range of 0.940 to 0.955 gram per cubic centimeter.

9. The process defined in claim 1 wherein a medium density polyethylene blend is produced under the following conditions:

in the first reactor:
  (1) the alpha-olefin is 1-hexene and/or 1-butene and is present in a ratio of about 0.03 to about 0.08 mole of alpha-olefin per mole of ethylene;
  (2) hydrogen is present in a ratio of about 0.0009 to about 0.06 mole of hydrogen per mole of ethylene; and
  (3) the ethylene partial pressure is in the range of about 20 to about 60 pounds per square inch; and in the second reactor:
  (1) the alpha-olefin is 1-hexene and/or 1-butene and is present in a ratio of about 0.05 to about 0.2 mole of alpha-olefin per mole of ethylene;
  (2) hydrogen is present in a ratio of about 1.3 to about 2.2 moles of hydrogen per mole of ethylene; and
  (3) the ethylene partial pressure is in the range of about 50 to about 120 pounds per square inch.

10. The process defined in claim 9 wherein the blend has a melt index (I 5) in the range of about 0.1 to about 0.6 grams per 10 minutes; a melt flow ratio (I 21.6/I 5) in the range of about 23 to about 40; and a density in the range of 0.918 to 0.940 gram per cubic centimeter.

11. A process for the production of a polyethylene blend in situ wherein the polymer formed in a first reactor is comprised of a copolymer of ethylene and 1-hexene and has a flow index (I 21.6) in the range of about 0.2 to about 5.0 grams per 10 minutes and a density in the range of about 0.890 to about 0.940 gram per cubic centimeter and the polymer formed in a second reactor is comprised of a copolymer of ethylene and 1-butene or 1-hexene and has a melt index (I 2.16) in the range of about 80 to about 1000 grams per 10 minutes and a density in the range of about 0.925 to about 0.970 gram per cubic centimeter, the weight ratio of first reactor polymer to second reactor polymer being in the range of about 0.8:1 to about 2.3:1, comprising contacting ethylene and the aforementioned alpha-olefins with a magnesium/titanium based catalyst system including a partially activated precursor and a cocatalyst in each of two fluidized bed reactors connected in series, in the gas phase, under polymerization conditions, with the provisos that:

(a) the precursor is formed by contacting an alkylaluminum halide with a solid reaction product wherein the alkylaluminum halide is represented by the formula $R_nAlY_{3-n}$ wherein R is an alkyl group having 1 to 8 carbon atoms, Y is a halogen, and n is 1 or 2 and the reaction product is represented by the formula $Mg_3Ti(OR)_8X_2$ wherein each R is independently an alkyl group having 1 to 4 carbon atoms and each X is independently a halide or a monovalent anion of a phenolic compound;

(b) the mixture of ethylene copolymer matrix and active catalyst formed in the first reactor in the series is transferred to the second reactor in the series;

(c) other than the active catalyst referred to in proviso (b) and the cocatalyst referred to in proviso (f), no additional catalyst is introduced into the second reactor;

(d) in the first reactor in which a low melt index copolymer is made:
  (1) alpha-olefin is present in a ratio of about 0.005 to about 0.4 mole of alpha-olefin per mole of ethylene;
  (2) hydrogen is, optionally, present in a ratio of about 0.0001 to about 0.3 mole of hydrogen per mole of ethylene; and
  (3) the ethylene partial pressure is in the range of about 10 to about 100 pounds per square inch; and (e) in the second reactor in which a high melt index copolymer is made:
  (1) alpha-olefin is, optionally, present in a ratio of about 0.005 to about 0.6 mole of alpha-olefin per mole of ethylene;
  (2) hydrogen, optional, is present in a ratio of about 1.0 to about 3.0 moles of hydrogen per mole of ethylene; and
  (3) the ethylene partial pressure is in the range of about 50 to about 120 pounds per square inch; and (f) additional hydrocarbyl aluminum cocatalyst is introduced into the second reactor in an amount sufficient to restore the level of activity of the catalyst transferred from the first reactor to about the initial level of activity in the first reactor.

* * * * *